(12) United States Patent
Yu et al.

(10) Patent No.: US 9,092,790 B1
(45) Date of Patent: Jul. 28, 2015

(54) MULTIPROCESSOR ALGORITHM FOR VIDEO PROCESSING

(75) Inventors: Renjie Yu, Shanghai (CN); Chin-Yee Lin, Los Gatos, CA (US)

(73) Assignee: VisualOn, Inc., San Jose, CA (US)

( * ) Notice: Subject to any disclaimer, the term of this patent is extended or adjusted under 35 U.S.C. 154(b) by 269 days.

(21) Appl. No.: 13/034,378

(22) Filed: Feb. 24, 2011

(51) Int. Cl.
*H04N 7/18* (2006.01)
*G06Q 30/02* (2012.01)
*H04N 21/81* (2011.01)

(52) U.S. Cl.
CPC ............. *G06Q 30/02* (2013.01); *H04N 21/812* (2013.01)

(58) Field of Classification Search
CPC ..... G06F 13/24; G06F 21/602; G06F 9/4401; H04L 9/00; H04L 9/08; H04L 41/5012; H04L 43/0876; H04L 29/06; H04L 29/08072; G06Q 10/10
USPC ............................................. 375/240, 240.03
See application file for complete search history.

(56) References Cited

U.S. PATENT DOCUMENTS

| | | | | |
|---|---|---|---|---|
| 5,784,494 | A * | 7/1998 | Strongin et al. | 382/233 |
| 7,475,257 | B2 * | 1/2009 | Aguilar et al. | 713/189 |
| 8,074,087 | B2 * | 12/2011 | Laughlin | 713/300 |
| 8,255,919 | B2 * | 8/2012 | Beverly et al. | 718/105 |
| 2002/0152301 | A1 * | 10/2002 | Garrett et al. | 709/224 |
| 2003/0208537 | A1 * | 11/2003 | Lane et al. | 709/204 |
| 2005/0114639 | A1 * | 5/2005 | Zimmer | 712/244 |
| 2005/0125582 | A1 * | 6/2005 | Tu et al. | 710/260 |
| 2006/0031569 | A1 * | 2/2006 | Desic et al. | 709/238 |
| 2007/0208956 | A1 * | 9/2007 | Lin et al. | 713/300 |
| 2008/0056347 | A1 * | 3/2008 | Chiu et al. | 375/240 |

OTHER PUBLICATIONS

Zakhor"Iterative Procedures for Reduction of Blocking Effects in Transform Image Coding", IEEE Trans on Cir and Sys for Video Technology vol. 2 No. 1 Mar. 1992.*
van der Tol et al. "Mapping of H.264 decoding on a multiprocessor architecture",Proc. SPIE 5022, Image and Video Communications and Processing 2003, (May 7, 2003); doi: 10.1117/ 12.476234.*
Azevedo et al. "Parallel H.264 Decoding on an Embedded Multicore Processor", A. Seznec et al. (Eds.): HiPEAC 2009, LNCS 5409, pp. 404-418, 2009; Springer-Verlag Berlin Heidelberg 2009.*

* cited by examiner

*Primary Examiner* — Jay Patel
*Assistant Examiner* — Frank Huang
(74) *Attorney, Agent, or Firm* — Van Pelt, Yi & James LLP

(57) ABSTRACT

A system for processing a macroblock comprises a plurality of processors and a selector. The selector is for selecting one processor of the plurality of processors based at least in part on a loading of the one processor. A step in processing the macroblock is assigned to the one processor.

21 Claims, 8 Drawing Sheets

MULTIPROCESSOR ALGORITHM FOR VIDEO PROCESSING

BACKGROUND OF THE INVENTION

Video processing and rendering has become a very popular application of computing technology. Customers now demand high quality video playback on their personal computers, and as internet-connected mobile devices become increasingly common, desire video playback on these mobile devices as well. The computing power of mobile devices is much more tightly constrained by factors such as cost, size, and power dissipation than that of personal computers, necessitating an efficient use of resources for a high performance application such as video playback. Multiple processor (multiprocessor) algorithms are commonly used to improve efficiency in high performance processing tasks. However, the efficiency improvement of a multiprocessor algorithm depends greatly on the effectiveness of the algorithm and the appropriateness of the task at hand for multiprocessing.

BRIEF DESCRIPTION OF THE DRAWINGS

Various embodiments of the invention are disclosed in the following detailed description and the accompanying drawings.

DETAILED DESCRIPTION

Figure 1:
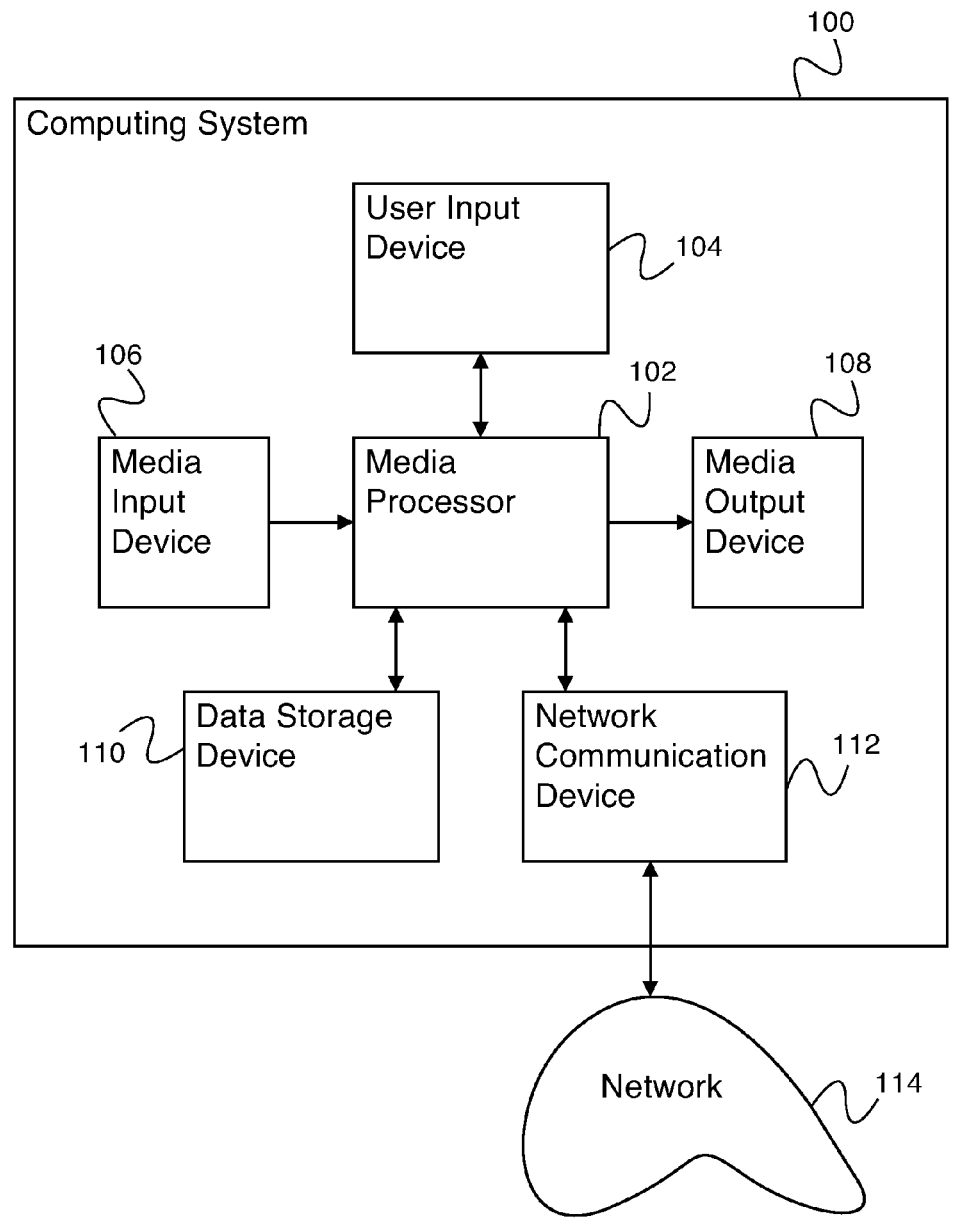
FIG. 1 is a block diagram illustrating an embodiment of a computing system for a multiprocessor algorithm for video processing.

The invention can be implemented in numerous ways, including as a process; an apparatus; a system; a composition of matter; a computer program product embodied on a computer readable storage medium; and/or, a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for processing a macroblock comprises a plurality of processors and a selector. The selector is for selecting one processor of the plurality of processors based at least in part on a loading of the one processor. A step in processing the macroblock is assigned to the one processor.

A multiprocessor algorithm for video processing is disclosed. The multiprocessor algorithm comprises an algorithm for determining how to divide the work of video processing among two or more processors running in parallel. In a typical video compression algorithm, video is comprised of a series of frames, each frame comprised of a set of macroblocks, and each macroblock comprised of a set of pixels. In some embodiments, a macroblock comprises a 16×16 block of pixels. The multiprocessor algorithm for dividing the work of decoding comprises dividing the processing of each macroblock among two or more processors. The work of decoding a macroblock is divided into several steps (e.g., parsing data stream, variable length coding decoding, inverse discrete cosine transform, motion compensation, dequantization, etc.), each of which is to be executed by a processor. When it is time to execute a step, the step is given to the processor with the least load. If there is an idle processor but no processing step to assign to it, processing of a new macroblock is started. This process balances the load between two or more processors, efficiently utilizing their combined power to improve macroblock processing throughput.

FIG. 1 is a block diagram illustrating an embodiment of a computing system for a multiprocessor algorithm for video processing. In various embodiments, computing system 100 comprises a computer, a mobile phone or other mobile computing system, an embedded computing system, or any other appropriate computing system. In the example shown, computing system 100 comprises media processor 102. Media processor 102 communicates with user input device 104, media input device 106, media output device 108, data storage device 110, and network communication device 112. User input device 104 comprises a user input for allowing a computing system user to interact with media processor 102. In some embodiments, user input device 104 comprises a device for receiving information from a user (e.g., a mouse, a keyboard, etc.). Media input device 106 comprises a device for receiving media input (e.g., a still camera, a video camera, a microphone) and relaying it to software on computing system 100 (e.g., software executing on media processor 102). Media output device 108 comprises a device for projecting media output (e.g., a video display, a speaker, etc.) received from software on computing system 100 (e.g., software executing on media processor 102). Data storage device 110 comprises a device for storing data (e.g., media data, media metadata, system information data, user data, network data, or any other appropriate data) and receiving data from and delivering data to software on computing system 100 (e.g., software executing on media processor 102). Network communication device 112 comprises a device for communicating data (e.g., media data, media metadata, system information data, user data, network data, or any other appropriate data) with a network (e.g., network 114) and receiving data from and delivering data to software on computing system 100 (e.g., software executing on media processor 102). In various embodiments, network 114 comprises a local area network, a wide area network, a wired network, a wireless network, the Internet, a fiber network, a storage area network, a cellular network, or any other appropriate network enabling communication.

In some embodiments, computing system 100 comprises a smart phone that includes media software coupled to one or more components, where the media software coupled to the one or more components is capable of loading a data file—for example, a video or audio file—and processing the data file to present the data file to a user. In various embodiments, the data file is presented to the user as a video stream displayed using a color or black and white display or an audio stream output using a speaker or headphones or broadcast to a wireless connected audio output device (e.g., a Bluetooth connected head set). In some embodiments, processing the data file includes decompressing or decrypting the data file—for example, processing the data file compatible with a format such as MPEG-1/MPEG-2/MPEG-4/H.264 (e.g. a format specified by the Moving Picture Experts Group), MP3 (e.g., MPEG-1 audio layer 3), AAC (Advanced Audio Coding), Windows Media Audio, Windows Media Video, MIDI (e.g., Musical Instrument Digital Interface), media containers such as AVI (e.g., audio video interleaved container format), ASF (e.g., advanced systems format for streaming, an audio/video container), WAV (e.g., waveform audio file format), or MOV (e.g., a quick time multimedia format). In various embodiments, data storage device 110 comprises a solid state memory (e.g., a random access memory), a magnetic memory, an optical memory, or any other appropriate data storage device.

Computing system 100 comprises a computing system for processing audio and video. In various embodiments, audio and video are stored in data storage device 110, received from network communication device 112, or accessed in any other appropriate way. In various embodiments, one or more of user input device 104, media input device 106, media output device 108, data storage device 110, or network communication device 112, are not present in computing system 100. In some embodiments, computing system 100 comprises a computing system for a multiprocessor algorithm for video processing. In some embodiments, computing system 100 comprises a processor coupled to a memory, where the memory is configured to provide the processor with instructions.

Figure 2:
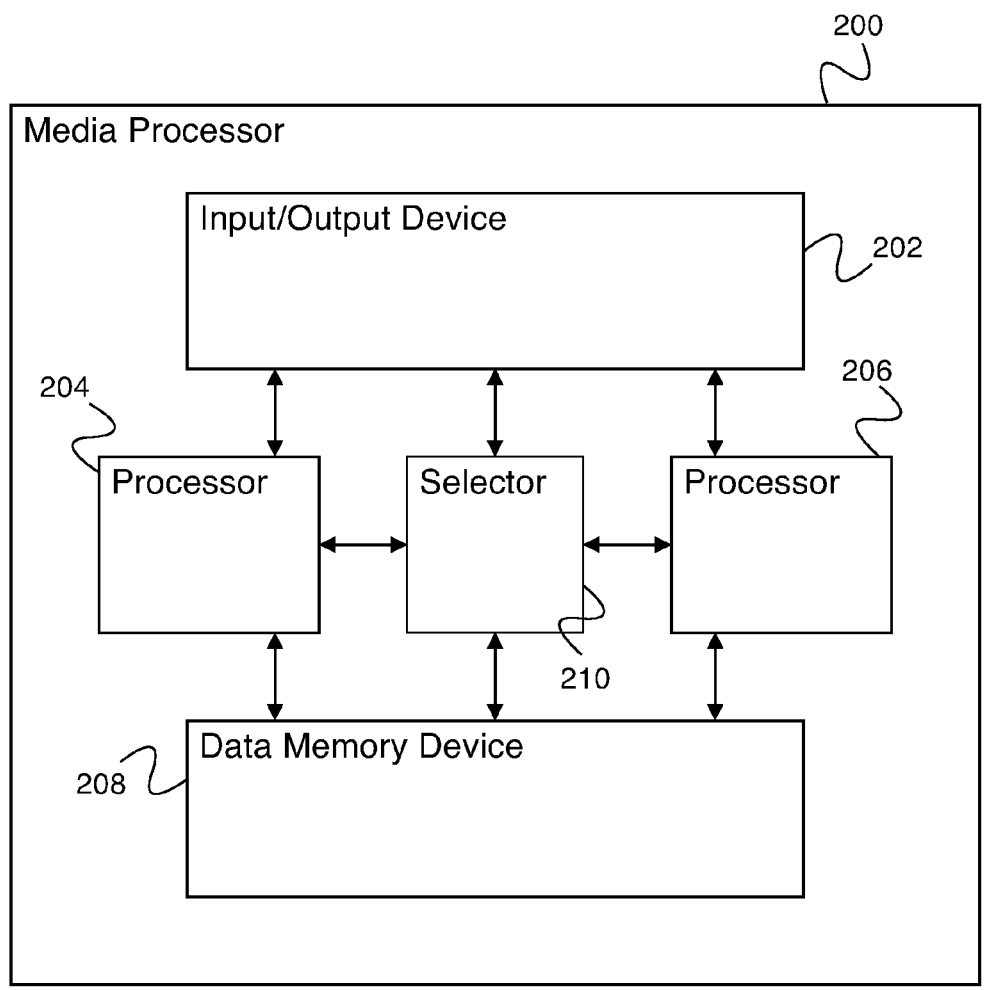
FIG. 2 is a block diagram illustrating an embodiment of a media processor.

FIG. 2 is a block diagram illustrating an embodiment of a media processor. In some embodiments, media processor 200 of FIG. 2 comprises media processor 102 of FIG. 1. In the example shown, input/output device 202 comprises an input/output device for communication with other devices within the computing system (e.g., user input device 104 of FIG. 1, media input device 106 of FIG. 1, media output device 108 of FIG. 1, data storage device 110 of FIG. 1, and network communication device 112 of FIG. 1). Input/output device 202 additionally communicates with processor 204 and processor 206. Processor 204 and processor 206 perform data processing on data received through input/output device 202. Selector 210 selects an appropriate processor for processing a step of processing a macroblock of a frame of a media stream processed by media processor 200. In some embodiments, processor 204 and processor 206 are configured identically and agree together on what data processing is to happen in which processor instead of having selector 210 select the processor. In some embodiments, one of processor 204 and processor 206 comprises a master device for determining what processing is to happen where, in addition to performing data processing, and the other of processor 204 and processor 206 comprises a slave device for performing the data processing assigned to it by the master device instead of having selector 210 select the processor. Data memory device 208 comprises a shared data memory device accessible by both processor 204 and processor 206. In some embodiments, data memory device 208 is used by processor 204 and processor 206 to share results of data processing. In various embodiments, media processor 200 comprises two processors, three processors, 10 processors, 256 processors, or any other appropriate number of processors. In some embodiments, media processor 200 comprises a multiprocessor device for a multiprocessor algorithm for video processing.

Figure 3:
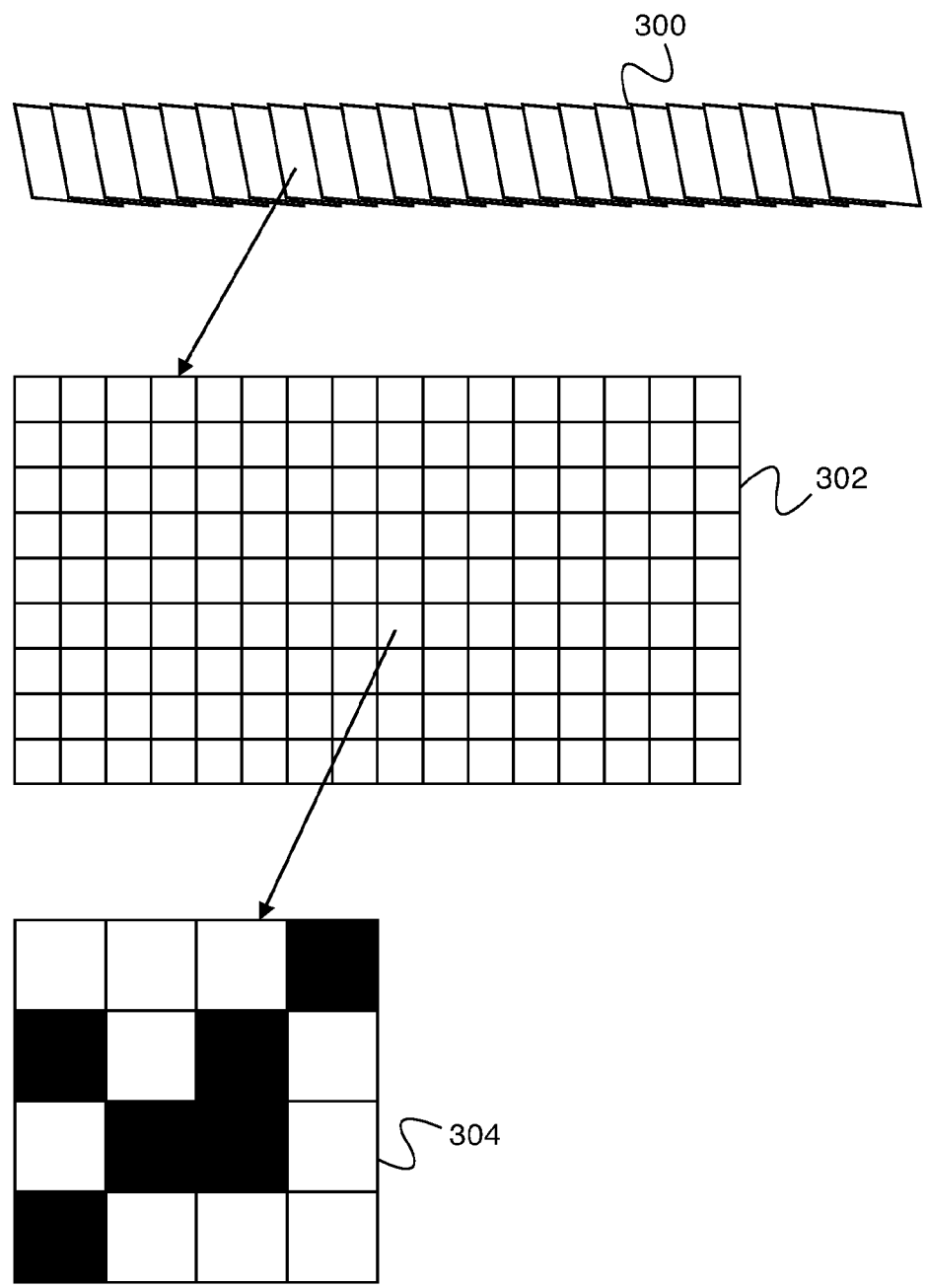
FIG. 3 is a diagram illustrating an embodiment of a video data storage scheme.

FIG. 3 is a diagram illustrating an embodiment of a video data storage scheme. In some embodiments, data stored according the data storage scheme of FIG. 3 is processed by a computing system (e.g., computing system 100 of FIG. 1). In the example shown, video is divided into series of frames 300. In some embodiments, some of frames 300 are reference frames, e.g., they can be decoded without information from any other frame; and some of frames 300 are delta frames, e.g., they encode only differences from other frames. In the example shown, frame 302 represents a single frame from series of frames 300. Frame 302 is comprised of 144 macroblocks. In various embodiments, frame 302 is comprised of 16 macroblocks, of 1200 macroblocks, of 14400 macroblocks, or of any other appropriate number of macroblocks. In the example shown, macroblock 304 comprises a single macroblock from frame 302. Macroblock 304 comprises a set of pixels comprising part of the image of frame 302. In the example shown, macroblock 304 comprises a 4×4 grid of pixels. In various embodiments, macroblock 304 comprises a 4×4 grid of pixels, an 8×8 grid of pixels, an 8×12 grid of pixels, a 12×12 grid of pixels, a 12×16 grid of pixels, a 16×16 grid of pixels, or any other appropriate size grid of pixels. In the example shown, the pixels comprising macroblock 304 comprise black and white pixels. In some embodiments, the pixels comprising macroblock 304 comprise color pixels. In some embodiments, the macroblock is stored and transmitted in an uncompressed form, for ease of decoding. In some embodiments, the macroblock is stored and transmitted in a compressed form, to reduce the amount of information necessary to store and transmit. In various embodiments, the macroblock additionally comprises inter frame prediction data, intra frame prediction data, motion vector data, header data, or any other appropriate data.

Figure 4:
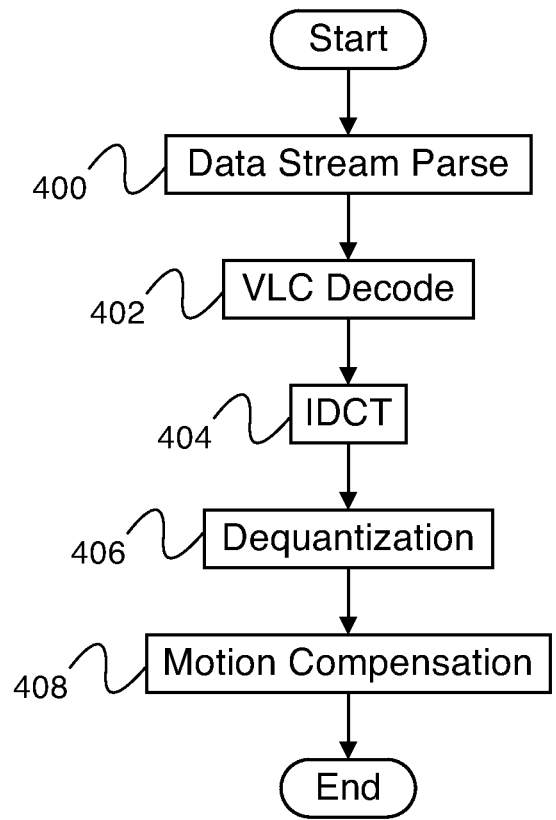
FIG. 4 is a flow diagram illustrating an embodiment of a process for decoding a compressed macroblock.

FIG. 4 is a flow diagram illustrating an embodiment of a process for decoding a compressed macroblock. In some embodiments, the process of FIG. 4 is used for decoding macroblock 304 of FIG. 3. In some embodiments, the process of FIG. 4 is executed by a processor (e.g., processor 204 of FIG. 2, processor 206 of FIG. 2, a combination of processor 204 and processor 206, etc.). In the example shown, in 400, an incoming data stream is parsed. In some embodiments, the incoming data stream is received through an input/output device (e.g., input/output device 202 of FIG. 2). In 402, a variable-length coding (VLC) decode step is performed on the parsed data. In 404, an inverse discrete cosine transform (IDCT) is performed on the decoded data. In 406, a dequantization step is performed on the transformed data. In 408, a motion compensation step is performed on the motion compensated data, and the decoding process is complete. In some embodiments, the data output of 400, 402, 404, 406, and 408 are stored in a memory (e.g., data memory device 208 of FIG. 2) after completion of processing, for later retrieval and/or further processing by the same processing device and/or by a different processing device. In some embodiments, the processing necessary for 400, 402, 404, 406, and 408 are each significant with respect to each other (e.g., none of steps 400, 402, 404, 406, and 408 take a negligible amount of processing compared to the others). In some embodiments, the amount of processing necessary for each of 400, 402, 404, 406, and 408 varies with the data content (e.g., the image and motion content of video represented by the compressed macroblock) and it can not be predicted beforehand which step or steps will consume the majority of processing time. In some embodiments, 400, 402, 404, 406, and 408 are divided between two or more processors according to a multiprocessor algorithm for video processing.

Figure 5:
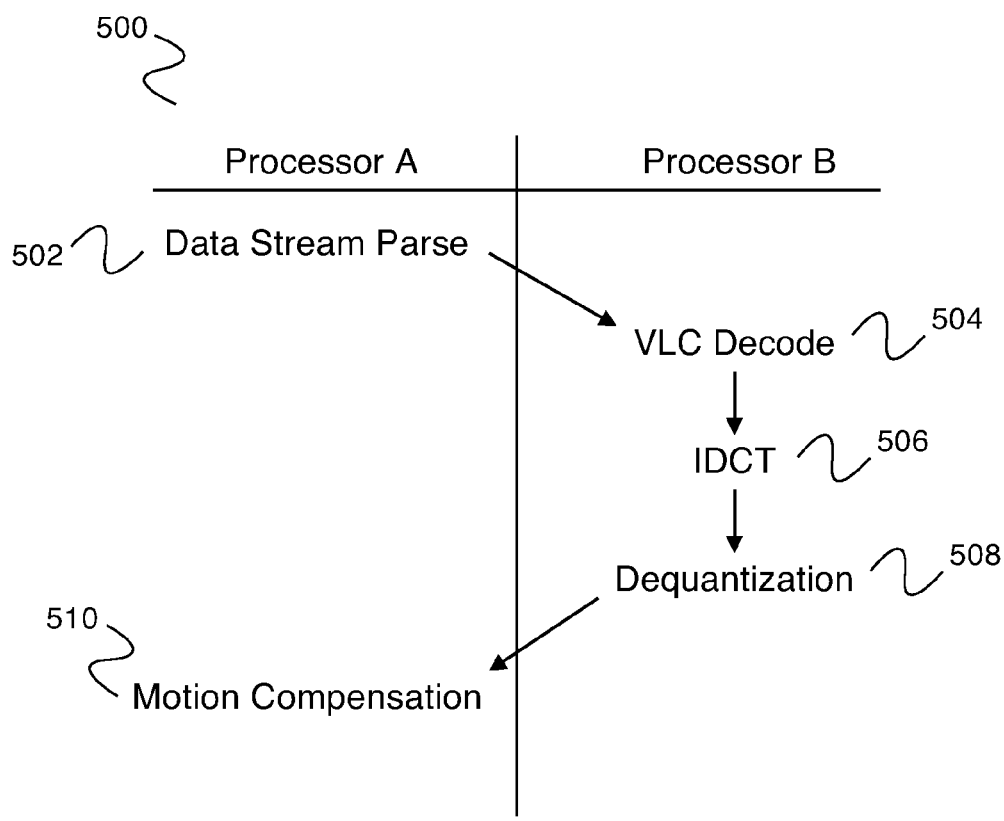
FIG. 5 is a chart of a division of video processing steps between two processors according to a multiprocessor algorithm for video processing.

FIG. 5 is a chart of a division of video processing steps between two processors according to a multiprocessor algorithm for video processing. Chart 500 comprises the steps of FIG. 4 (e.g., 400, 402, 404, 406, and 408 of FIG. 4) divided between two processors, processor A (e.g., processor 204 of FIG. 2) and processor B (e.g., processor 206 of FIG. 2), representing the work of a macroblock decoding step divided between the two processors. In the example shown, data stream parse step 502 is performed by processor A, VLC decode step 504 is performed by processor B, IDCT step 506 is performed by processor B, dequantization step 508 is performed by processor B, and motion compensation step 510 is performed by processor A. When each step is to be performed, it is determined which processing module has the least load, and the step is assigned to that processing module. When the step completes, the processing module writes the output to a shared memory (e.g., data memory device 208 of FIG. 2) such that processing can be continued by a different processing module. In the example shown, chart 500 comprises a division of work between two processors. In various embodiments, work is divided between two processors, three processors, sixteen processors, or any other appropriate number of processors. In some embodiments, if a processor has a load below a predetermined threshold and there is no processing step to assign to the processor, processing of a new macroblock is started by that processor. In some embodiments, processor A parses data stream 1 and passes things off to processor B for VLC decoding and then processor A parses data stream 2 before motion compensating stream 1.

Figure 6A:
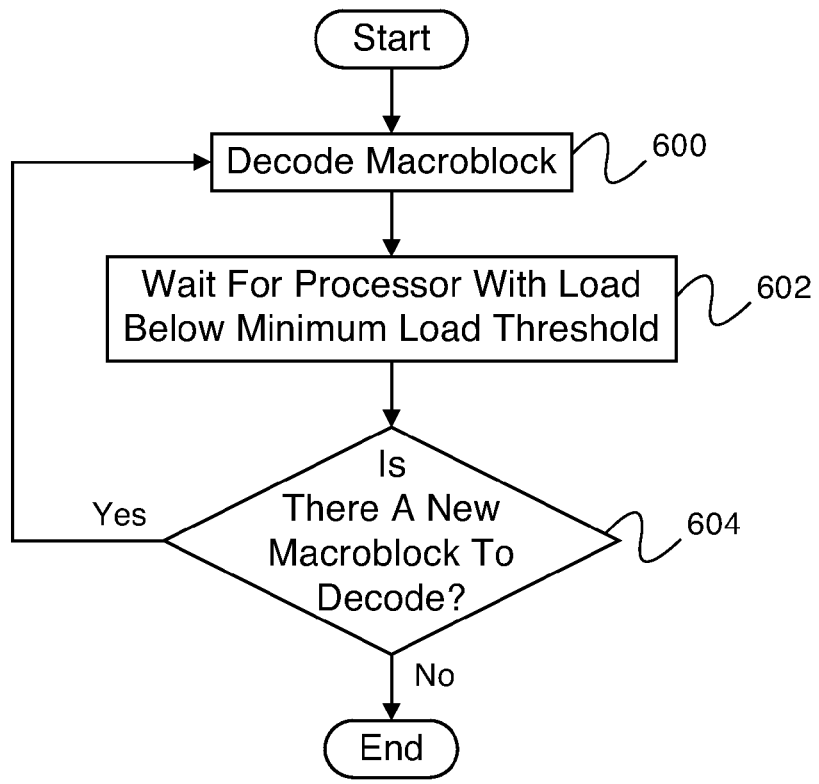
FIG. 6A is a flow diagram illustrating an embodiment of a process for decoding a set of macroblocks using a multiprocessor algorithm for video processing.

FIG. 6A is a flow diagram illustrating an embodiment of a process for decoding a set of macroblocks using a multiprocessor algorithm for video processing. In some embodiments, the set of macroblocks comprise a frame of video (e.g., frame 302 of FIG. 3). In some embodiments, the set of macroblocks comprise a series of frames of video (e.g., series of frames 300 of FIG. 3). In some embodiments, the process of FIG. 6A is executed by a media processor (e.g., media processor 200 of FIG. 2). In the example shown, in 600 a macroblock is decoded. Once the decode macroblock step has begun, it executes in the background while the process of FIG. 6A continues to 602. In 602, the process waits for a processor with a load below a minimum load threshold (e.g., an idle processor). In various embodiments, a processor becomes idle because a decode macroblock step has completed, because a decode macroblock step cannot use all of the available processors at the same time, or for any other appropriate reason. When there is a processor with a load below the minimum load threshold, the process continues to 604. In 604, the process determines if there is a new macroblock to decode. If there is a new macroblock to decode, the process returns to 600, where the macroblock is decoded. If there is no new macroblock to decode, the process ends. Since decode macroblock step 600 executes in the background of the process of FIG. 6A, processing continues after it is determined that there are no new macroblocks to decode until all macroblocks currently being decoded are completed.

Figure 6B:
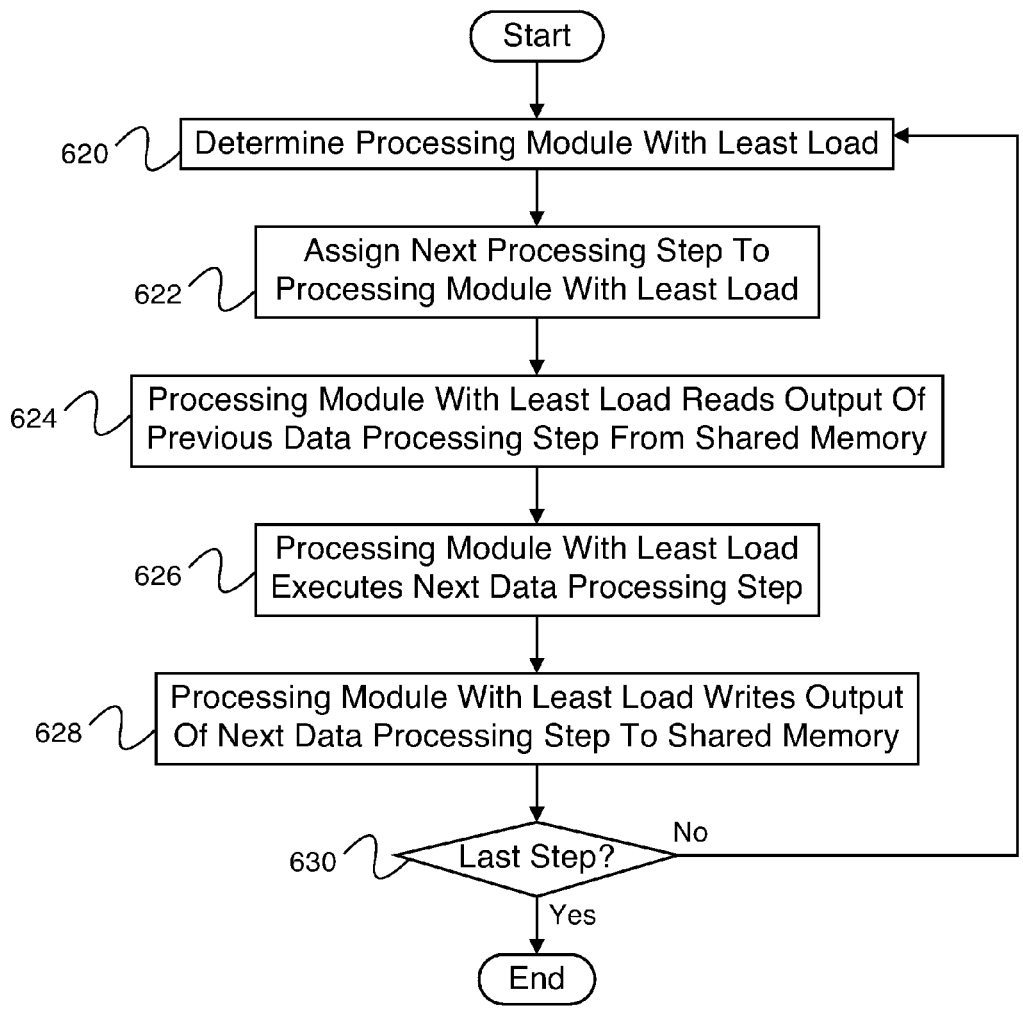
FIG. 6B is a flow diagram illustrating an embodiment of a process for a multiprocessor algorithm for video processing.

FIG. 6B is a flow diagram illustrating an embodiment of a process for a multiprocessor algorithm for video processing. In some embodiments, the process of FIG. 6 is executed by a media processor (e.g., media processor 200 of FIG. 2) comprising two or more processors (e.g., processor 204 of FIG. 2 and processor 206 of FIG. 2) and a shared memory (e.g., data memory device 208 of FIG. 2). In some embodiments, the process of FIG. 6 is used to assign processing tasks to individual processing modules of a multiprocessor (e.g., creating a division of tasks between multiple processing modules as shown in chart 500 of FIG. 5). In some embodiments, the process of FIG. 6B comprises 600 of FIG. 6A. In the example shown, in 620, the processing module with the least load is determined. In various embodiments, the processing module with the least load is determined by executing a processor instruction to return the load value for each processor, by externally monitoring the load for each processor, by checking a log file where the load for each processor is recorded, or by any other appropriate method. In 622, the processing module determined to have the least load is assigned the next data processing step (e.g., one of 400, 402, 404, 406, and 408 of FIG. 4). After the processing module determined to have the least load is assigned the next data processing step, the processing module begins executing the next processing step. In 624, the processing module determined to have the least load reads the output of the previous data processing step from the shared memory. If the next data processing step is the first data processing step (e.g., step 400 of FIG. 4), there is no output of a previous data processing step stored in shared memory, so step 624 is skipped. In 626, the processing module determined to have the least load executes the next data processing step. Executing the data processing step takes an amount of time that depends on the processing step, the data set, the processing module, and any other appropriate factors. In 628, when execution of the new data processing step is complete, the processing module determined to have the least load writes the output of the next data processing step to the shared memory. In some embodiments, if the next data processing step is the last data processing step (e.g., step 408 of FIG. 4), the output of the data processing step is sent out from the media processor (e.g., through input/output device 202 of FIG. 2) and is not stored in the shared memory. In 630, it is determined whether the next data processing step just completed processing is the last data processing step for the macroblock. If the step just completed processing is not the last data processing step for the macroblock, the process returns to 620 and begins again for the following data processing step. If the step just completed is the last data processing step for the macroblock, the process ends.

In some embodiments, the processing module is selected based on processing load, but not necessarily the least processing load. In some embodiments, processing throughput is considered in the selection of the processor. In some embodiments, processor is pre-selected for different some or all of the steps for processing a macroblock.

Figure 7:
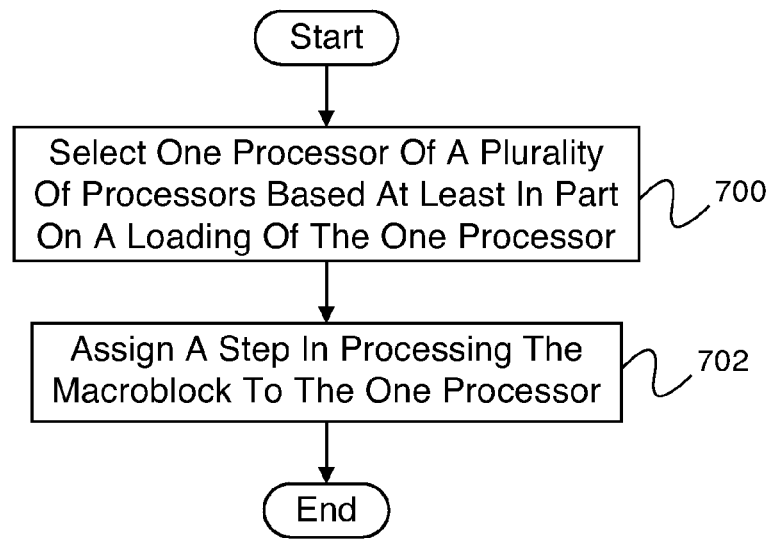
FIG. 7 is a flow diagram illustrating an embodiment of a process for processing a macroblock.

FIG. 7 is a flow diagram illustrating an embodiment of a process for processing a macroblock. In some embodiments, the process of FIG. 7 comprises a multiprocessor algorithm for video processing. In some embodiments, the process of FIG. 7 is used for decoding macroblock 304 of FIG. 3. In some embodiments, the process of FIG. 7 is executed by a media processor (e.g., media processor 200 of FIG. 2) comprising a plurality of processors (e.g., processor 204 of FIG. 2 and processor 206 of FIG. 2). In some embodiments, the process of FIG. 7 is executed by a system including a media processor (e.g., media processor 102 of FIG. 1) and one or more of the following: a user input device (e.g., user input device 104 of FIG. 1), a media input device (e.g., media input device 106 of FIG. 1), a data storage device (e.g., data storage device 110 of FIG. 1), or a network communications device (e.g., network communications device 112 of FIG. 1). In some embodiments, the process of FIG. 7 includes a media output device (e.g., media output device 108 of FIG. 1). In some embodiments, the media output device comprises a display. In some embodiments, the media output device comprises a speaker. In various embodiments, the media processor processes video for one of the following: a mobile phone, a mobile computing system, an embedded computing system, or any other appropriate system with media processing. In some embodiments, the macroblock is one of a set of macroblocks. In some embodiments, a frame (e.g., frame 302 of FIG. 3) is comprised of the set of macroblocks. In some embodiments, the frame comprises a reference frame of a video stream. In some embodiments, the frame comprises a delta frame of a video stream.

In the example shown, in 700, one processor of a plurality of processors is selected based at least in part on a loading of the one processor. In some embodiments, selecting the one processor of the plurality of processors is based at least in part on a loading of each of the plurality of processors. In some embodiments, selecting is based at least in part on a processor with a least loading of the plurality of processors. In 702, a step in processing the macroblock is assigned to the one processor. In various embodiments, the step in processing the macroblock comprises parsing a media data stream, decoding variable length coding of a media data stream, dequantizing a media data stream, or any other appropriate processing step.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for processing macroblocks of media stream data, comprising:
 a plurality of processors running in parallel;
 a divider configured to divide the processing of macroblocks of media stream data into a plurality of steps, wherein a macroblock is one of a plurality of macroblocks, wherein a frame is comprised of the plurality of macroblocks, wherein a step of the plurality of steps in processing of the macroblock of media stream data is processed by one of the plurality of processors, wherein the plurality of steps includes at least two of the following: a data stream parsing step, a variable-length coding decode step, an inverse discrete cosine transform step, a dequantization step, and a motion compensation step, wherein an amount of processing per step of the plurality of steps in processing of the macroblock varies with a data content of the media stream data; and
 a selector configured to:
  assign a first step of the processing of a first macroblock of media stream data from one of the plurality of media streams to one of the plurality of processors;
  determine a loading of each of the plurality of processors,
  determine one processor of the plurality of processors with the least loading of the plurality of processors, and assign a next step of the plurality of steps in processing the first macroblock of media stream data to the one processor with the least loading,
  assign a step of the processing of a second macroblock of a second stream from one of the plurality of media streams to one of the plurality of processors before the first macroblock is done processing;
  in the event that one of the plurality of processors has a load below a predetermined threshold and there is no next step of the plurality of steps in processing of the first macroblock of media stream data, assign a step of processing a new third macroblock from a data stream of the plurality of data streams to the one processor with a load below the predetermined threshold, wherein the first, second, and third macroblocks each is a single macroblock; and wherein the first step of the processing of the first macroblock, the next step of the plurality of steps in processing the first macroblock, the step of the processing of the second macroblock, and the step of processing the new third macroblock each is a single stem.

2. The system as in claim 1, wherein a media processor comprises the plurality of processors.

3. The system as in claim 2, wherein the media processor processes video for one of the following: a mobile phone, a mobile computing system, or an embedded computing system.

4. The system as in claim 1, further comprising a shared memory, wherein after performing one of the steps in the processing of the macroblock of media stream data, output data of the step is stored.

5. The system as in claim 1, wherein the variable-length coding decode step in processing the macroblock is performed on the macroblock after the data stream parsing data.

6. The system as in claim 1, wherein the inverse discrete cosine transform step in processing the macroblock is performed on the macroblock after the variable-length coding decode step.

7. The system as in claim 1, wherein the motion compensation step in processing the macroblock is performed on the macroblock after the dequantization step.

8. The system as in claim 1, wherein the dequantization step in processing the macroblock is performed on the macroblock after the inverse discrete cosine transform step.

9. The system as in claim 1, wherein the frame comprises a reference frame of a video stream.

10. The system as in claim 1, wherein the frame comprises a delta frame of a video stream.

11. The system as in claim 1, further comprising one or more of the following: a user input device, a media input device, a data storage device, or a network communication device.

12. The system as in claim 1, further comprising a media output device.

13. The system as in claim 12, wherein the media output device comprises a display.

14. The system as in claim 12, wherein the media output device comprises a speaker.

15. A method for processing macroblocks of media stream data, comprising:
 dividing processing of macroblocks of media stream data into a plurality of steps, wherein a macroblock is one of a plurality of macroblocks, wherein a frame is comprised of the plurality of macroblocks, wherein a step of the plurality of steps in processing of the macroblock of media stream data is processed by one of a plurality of processors running in parallel, wherein the plurality of steps includes at least two of the following: a data stream parsing step, a variable-length coding decode step, an inverse discrete cosine transform step, a dequantization step, and a motion compensation step, wherein an amount of processing per step of the plurality of steps in processing of the macroblock varies with a data content of the media stream data;

assigning a first step of the processing of a first macroblock of media stream data from one of the plurality of media streams to one of the plurality of processors;

determining a loading of each of the plurality of processors;

determining one processor of the plurality of processors with the least loading of the plurality of processors, and assigning a next step of the plurality of steps in processing the first macroblock of media stream data to the one processor with the least loading;

assigning a step of the processing of a second macroblock of a second stream from one of the plurality of media streams to one of the plurality of processors before the first macroblock is done processing;

in the event that one of the plurality of processors has a load below a predetermined threshold and there is no next step of the plurality of steps in processing of the first macroblock of media stream data, assigning a step of processing a new third macroblock from a data stream of the plurality of data streams to the one processor with a load below the predetermined threshold, wherein the first, second, and third macroblocks each is a single macroblock; and wherein the first step of the processing of the first macroblock, the next step of the plurality of steps in processing the first macroblock, the step of the processing of the second macroblock, and the step of processing the new third macroblock each is a single step.

16. A computer program product for processing macroblocks of media stream data, the computer program product being embodied in a non-transitory computer readable storage medium and comprising computer instructions for:

dividing processing of macroblocks of media stream data into a plurality of steps, wherein a macroblock is one of a plurality of macroblocks, wherein a frame is comprised of the plurality of macroblocks, wherein a step of the plurality of steps in processing of the macroblock of media stream data is processed by one of a plurality of processors running in parallel, wherein the plurality of steps includes at least two of the following: a data stream parsing step, a variable-length coding decode step, an inverse discrete cosine transform step, a dequantization step, and a motion compensation step, wherein an amount of processing per step of the plurality of steps in processing of the macroblock varies with a data content of the media stream data;

assigning a first step of the processing of a first macroblock of media stream data from one of the plurality of media streams to one of the plurality of processors;

determining a loading of each of the plurality of processors;

determining one processor of the plurality of processors with the least loading of the plurality of processors, and assigning a next step of the plurality of steps in processing the first macroblock of media stream data to the one processor with the least loading;

assigning a step of the processing of a second macroblock of a second stream from one of the plurality of media streams to one of the plurality of processors before the first macroblock is done processing;

in the event that one of the plurality of processors has a load below a predetermined threshold and there is no next step of the plurality of steps in processing of the first macroblock of media stream data, assign a step of processing a new third macroblock from a data stream of the plurality of data streams to the one processor with a load below the predetermined threshold, wherein the first, second, and third macroblocks each is a single macroblock; and wherein the first step of the processing of the first macroblock, the next step of the plurality of steps in processing the first macroblock, the step of the processing of the second macroblock, and the step of processing the new third macroblock each is a single step.

17. A system as in claim 1, wherein the next step in the processing of the first macroblock of media stream data is assigned to a different processor of the plurality of processors than the one that processed a previous step in processing of the macroblock of media stream data.

18. A system as in claim 1, wherein the plurality of processors comprises three or more processors, and the divider divides the plurality of steps of processing of the macroblock of media stream data and the selector assigns a step of the plurality of steps of processing of the macroblock of media stream data to the three or more processors.

19. A system as in claim 1, wherein the selector configured to determine the loading of each of the plurality of processors comprises determining the loading by one or more of the following: executing a processor instruction to return a load value for each processor, externally monitoring a loading for each processor, checking a log file where a loading for each processor is recorded.

20. A system as in claim 4, wherein the one processor assigned with the next step is configured to read an output of a previous step in the plurality of steps of the first macroblock from the shared memory.

21. A system as in claim 1, wherein the selector is configured to assign a next step of the plurality of steps based on throughput of each of the plurality of processors.

* * * * *